(12) United States Patent
Albers et al.

(10) Patent No.: US 8,533,727 B2
(45) Date of Patent: Sep. 10, 2013

(54) METHOD FOR ANALYSING THE REAL-TIME CAPABILITY OF A SYSTEM

(75) Inventors: Karsten Albers, Weilheim (DE); Steffen Kollmann, Ulm (DE); Frank Slomka, Weissenhorn (DE)

(73) Assignee: Inchron GmbH, Potsdam (DE)

(*) Notice: Subject to any disclaimer, the term of this patent is extended or adjusted under 35 U.S.C. 154(b) by 0 days.

(21) Appl. No.: 13/201,301

(22) PCT Filed: Feb. 12, 2010

(86) PCT No.: PCT/EP2010/051783
§ 371 (c)(1),
(2), (4) Date: Oct. 25, 2011

(87) PCT Pub. No.: WO2010/092146
PCT Pub. Date: Aug. 19, 2010

(65) Prior Publication Data
US 2012/0036510 A1    Feb. 9, 2012

Related U.S. Application Data

(60) Provisional application No. 61/152,828, filed on Feb. 16, 2009.

(51) Int. Cl.
*G06F 9/46* (2006.01)
(52) U.S. Cl.
USPC .......................................... 718/104

(58) Field of Classification Search
None
See application file for complete search history.

(56) References Cited

U.S. PATENT DOCUMENTS

2008/0098207 A1* 4/2008 Reid et al. ............... 712/227
2008/0184268 A1* 7/2008 Pietrek et al. ............ 719/318

OTHER PUBLICATIONS

Bodmann, et al, "Analyzing the Timing Characteristics of Task Activations", First IEEE Symposium on Industrial Embedded Systems, Oct. 2006, pp. 1-8.*

* cited by examiner

*Primary Examiner* — Camquy Truong
*Assistant Examiner* — Gregory A Kessler
(74) *Attorney, Agent, or Firm* — Hoffmann & Baron, LLP.

(57) ABSTRACT

The invention provides a method for analysing the real-time capability of a system, in particular a computer system, where various tasks are provided, wherein the tasks are repeatedly performed and wherein an execution of a task is triggered by an activation of the task and this represents an event of the task, wherein a plurality of descriptive elements are provided to describe the time correlation of the events as event stream, wherein the event streams may detect the maximum time densities of the events and/or the minimum time densities of the events, and wherein at least a further descriptive element to which an amount of event streams is assigned and which describes the time correlation of an entirety of events which are captured by at least two event streams.

11 Claims, 3 Drawing Sheets

```
1  Δβ(n) {
2      n_i ∈ ℕ;
3      Δe_old = ∞;
4      for ((∀N|∑n_i = n)) {
5          Δt = max{Δt^+(Θτ_i, n_i)}
6          Δe = 0;
7          for (∀τ_i|τ_i ∈ Γ_R) {
8              Δe = Δe + (n_i − 1) · c^−_{τ_i}; }
9          Δe_old = min(Δe_old, max(Δe, Δt));  }
10     return Δe_old;}
```

Fig. 3

```
1  // Δt The interval which is considered
2  // k Number of calls of τ
3  // τ The task under analysis
4  // Θ_all All necessary limiting event streams
5  // Γ_HP Set of τ': φ_τ > φ_τ'
6  calcHPStatic(Δt, k, τ, Θ_all, Γ_HP) {
7      Δe = 0;
8      sort(Γ_HP);   // ∀i ≤ j : c_{τ_i} ≥ c_{τ_j};
9      (∀Θ ∈ Θ_all) : η[Θ] = η(Δt, Θ_Θ);
10     (∀Θ ∈ Θ_all|Θ_τ ∈ Θ_Θ) : η[Θ] = η[Θ] − k;
11     for (τ_j ∈ Γ_HP) {
12         n = η(Δt, Θ_{τ_j});
13         m = min(η[Θ]|Θ_{τ_j} ∈ Θ_Θ);
14         Δe = Δe + min(n, m) · c^+_{τ_j};
15         for ((∀Θ ∈ Θ_all|Θ_{τ_j} ∈ Θ_Θ) {
16             η[Θ] = η[Θ] − min(n, m); } }
17     return Δe; }
```

Fig. 4

METHOD FOR ANALYSING THE REAL-TIME CAPABILITY OF A SYSTEM

CROSS-REFERENCE TO RELATED APPLICATIONS

This application is the U.S. National Phase of International application No. PCT/EP2010/051783 filed Feb. 12, 2010, which claims priority to U.S. Provisional Patent Application No. 61/152,828 filed Feb. 16, 2009, both of which are incorporated herein by reference in their entireties.

BACKGROUND

The invention relates to a computer-implemented method for analysing the time response of complex distributed systems comprising program modules (tasks) and/or electronic circuit modules.

Such systems consist of a plurality of components in the form of program modules (tasks) and/or electronic circuit modules. The components communicate with each other and process or transform data. Further, such systems may comprise sensors for detecting data, modules for interacting with the user, actuators for physically influencing the environment or other systems as well as output media for transmitting information to the user or the environment.

Certain components (execution resources), in turn, may partly execute one or more program modules. If more modules are executed, the order or the distribution of execution times can be assigned to the individual modules with sequence planning or scheduling method.

Possible executions of scheduling methods are static scheduling methods, where the order of executions and the distribution of execution times for the modules to be executed are statically determined, and also dynamic scheduling methods, where the order and the execution time distribution are determined according to a predetermined strategy regarding runtime depending on data to be processed, the executions of other modules, the environment and/or user interactions.

Such systems and components may be time-critical in that they do not only require a correct determination of results and control decisions but there are also requirements of the duration of detection and points in time for providing results. Examples of such requirements are maximum latency periods for the determination of results or guaranteed response times to changes in values or sensor or input data. However, such requirements may also be provision of new calculation results in regular time lags or within a fixed time frame.

Modules may activate each other and/or exchange data asynchronously via communication link. For modelling said communication or activation links, numerous event models have been developed. Such relations may be modeled by, e.g., only one single period, one period and a jitter, an event stream [Gresser: Echtzeitnachweis Ereignisgesteuerter Realzeitsysteme, München 1993, (incorporated herein by reference)] or hierarchical event streams (see WO 2008/003427). Many other event models are also possible.

As regards the analysis of real-time systems, it is important to approach the processes in a real system as closely as possible. The various components and tasks are implicitly interrelated to a great extent in real embedded systems, which excludes execution scenarios, which cannot be ruled out in the real-time analysis without considering these dependencies. Thus, the real-time analysis could yield more conservative results like longer maximum reaction times (response times) than required for real systems.

A series of dependencies are considered in existing real-time analyses. However, this always requires a specific broadening of the analysis algorithms for considering exactly the desired type of dependencies. Consequently, considering new types of dependencies in the analysis is complicated. Further, the existing real-time analysis methods cover only part of the dependencies.

SUMMARY

Thus, it is advantageous to have a mechanism to separate the determination and modeling of dependencies from the actual real-time analysis. Consequently, in the real-time analysis only this abstract dependency model has to be considered in order to take into account all dependencies for which said abstract model can be determined.

According to the invention, such a mechanism is suggested, the limiting event streams.

According to a first aspect, the invention provides a computer-implemented method for analysing the real-time capability of a system, in particular a computer system, where various tasks are provided, wherein the tasks are repeatedly performed and
wherein an execution of a task is triggered by an activation of the task and this represents an event of the task,
wherein a plurality of descriptive elements are provided to describe the time correlation of the events as event stream,
wherein the event streams may detect the maximum time densities of the events and/or the minimum time densities of the events,
and wherein at least a further descriptive element to which an amount of event streams is assigned and which describes the time correlation of an entirety of events which are captured by at least two event streams.

The at least one further descriptive element preferably describes a limiting event stream.

It is preferred that at least one of the further descriptive elements or limiting event streams describes the maximum time correlation of an entirety of events which are captured by at least two event streams, wherein for at least a time interval (dt) the amount of events, which are admissible by the limiting event stream in dt, is lower than the sum of events which are admissible by the non-limiting event streams in dt.

At least one of the further descriptive elements or limiting event streams preferably describes the minimum time correlation of an entirety of events, which are captured by at least two event streams, wherein for at least a time interval (dt), the amount of events which is admissible by the limiting event stream in dt, exceeds the sum of events which are admissible by the non-limiting event streams in dt.

The system is preferably assigned at least one component or resource and at least one of said component(s) is assigned at least two tasks.

At least two tasks are preferably comprised to one group, the tasks of a group are assigned to a resource and the tasks compete for the resource or the tasks of this group may dispose of the resource only at different times and the system comprises a method to determine the points in time where the resource is assigned to a certain task of the group.

According to a preferred embodiment, at least one of the limiting event streams is assigned at least two limited event streams, which activate respectively different tasks, wherein these tasks are assigned to at least one joint group, wherein costs are respectively assigned to the tasks which capture the temporal use of the resource by the task for respectively one event, further comprising the step of
determining the costs jointly required by the tasks,
comprising the steps of
assigning the events of the limiting event stream to the task with the highest costs, wherein the amount of the assigned events is limited by the event stream activating the task,
determining the remaining results of the limiting event stream considering the amount of the assigned events, assigning the remaining events of the limiting event stream to the task with the next highest costs, wherein in turn the amount of the assigned events is limited by the event stream activating said tasks, repeating said steps until all events of the limiting event stream are assigned, and detecting the entire costs from the costs of the individual tasks and the amount of the respectively assigned events.

According to a second aspect, the invention provides a computer-implemented method for analysing the real-time capability of a system, in particular a computer system, where a plurality of different tasks are provided, wherein the tasks are repeatedly executed, and wherein an execution of a task is triggered by an activation of the task and this represents an event of the task, wherein one or more descriptive elements are provided to describe the time correlation of the events as event stream, wherein the event streams may capture the maximum time densities of the events and/or the minimum time densities of the events, at least a further descriptive element to which an amount of event streams is assigned and which describes the time correlation of an entirety of events which are captured by at least two event streams, wherein at least one of the limiting event streams is assigned at least two limited event streams, which activate respectively different tasks, wherein said tasks are assigned to at least a joint group, wherein tasks are assigned respective costs detecting the temporal use of the resource by the task for respectively one event, further comprising the step of determining the costs jointly required by the tasks, comprising the steps of assigning the events of the limiting event stream to the task with the highest costs, wherein the amount of the assigned events is limited by the event stream activating the task, determining the remaining results of the limiting event stream considering the amount of the assigned events, assigning the remaining events of the limiting event stream to the task with the next highest costs, wherein in turn the amount of the assigned events is limited by the event stream activating said task, repeating said steps until all events of the limiting event stream are assigned, and detecting the entire costs from the costs of the individual tasks and the amount of the respectively assigned events.

According to both aspects of the invention, at least two event streams are assigned two different limiting event streams, further comprising the step of determining the costs jointly required by the tasks, comprising the steps of assigning the events of the limiting event streams to the task with the highest costs, wherein the amount of the assigned events is limited by the event stream activating the task and the minimum of amount of events respectively admissible by the limiting event streams, determining the remaining events of the limiting event streams, wherein the amount of the actually assigned events is considered, assigning the remaining events of the limiting event streams of the task with the next highest costs, wherein in turn the amount of the assigned events is limited by the event stream activating said task and the other limiting event streams assigned to the task, repeating said steps until all events of the limiting event streams are assigned or event amounts are assigned to all tasks of the group, determining the entire costs from the costs of the individual tasks and the amount of events respectively assigned to them.

The limiting event streams are preferably assigned to an amount of points to describe the density of the events in the time intervals and the limiting event streams are assigned at least two limited event streams which require for an event a different amount of points.

The activation of a first task may be performed by a second task, wherein the time correlation of these activations can be also captured by event streams (outputted event stream of the first task, incoming event stream of the second task).

It is preferred that at least two resources are assigned to the system, wherein a first group of tasks is assigned to a first resource and a second group of tasks is assigned to a second resource, wherein at least two tasks of the first group respectively activate a task of the second group directly or via a plurality of tasks, comprising the steps of:

determining at least a limiting event stream for the outputted event streams of the first task, determining at least a limiting event stream for the incoming event streams of the second task unless activation for at least a second task is performed directly by a first task, detecting the costs jointly required by the second tasks considering the limiting event streams of the incoming event streams of the second tasks.

For determining at least one of the limiting event streams of the second tasks the limiting event stream of the first task is used.

The tasks are preferably units which can be executed by a CPU or an electronic circuit module.

Generally an amount of event streams in a system may be assigned to a further descriptive element, preferably a limiting event stream. With this limiting event stream the correlated requirements of all limited event streams assigned to the limiting event stream are described. If, e.g., for the interval 10 ms a maximum amount of 5 events is assigned to a limited event stream ES_AB to which the event streams ES_A and ES_B are assigned and which describes the maximum amount of events, it means that in the real system the stimulations underlying ES_A and ES_B cannot lead to altogether more than 5 events in a 10 ms interval. This is in particular also true when, e.g., ES_A in an arbitrary 10 ms interval may be assigned 6 events and ES_B in an arbitrary (other) 10 ms interval may be assigned 7 events, i.e., the sum of ES_A and ES_B for an interval exceeds the value of the limiting event stream ES_AB. A limiting event stream is only advantageous if at least one such interval exists. If the sum of the event streams assigned to a limiting event stream for no interval exceeds the value of the limiting event stream for the same interval, said limiting event stream is not relevant to the analysis.

Corresponding to limiting event streams for maximum event streams also limiting event streams for minimum event streams may be set. A minimally limiting event stream is relevant if it exceeds for at least one interval the sum of the event streams assigned to it.

An example for a dependency which may be described by a limiting event stream results from the competition between two or more tasks for, e.g., a joint execution resource. For each task alone the highest possible density of events outputted from the task results, i.e., the maximum values for the event stream outputted from the task for such intervals in which the task is assigned a highest possible proportion of the joint execution resource of the scheduling method. However, it is often the case that the second task cannot be assigned such a high proportion of the joint execution resource, which means that not the maximum values for the outputted event stream of the second task ensue for these intervals. Thus, often the maximum values for the outputted event stream of the first task and the outputted event stream of the second task cannot coincide. This relation can be described by a limiting event stream describing the highest possible coincidence of the respectively outputted event streams in view of the competitive situation.

A limiting event stream may also be set for an amount of events or energy amounts instead of for time intervals. It is important in this respect that a limiting event stream and the limiting event streams assigned to it are based on the same kinds of values.

In a limiting event stream amounts of points, i.e. a weighing factor, may also be assigned to time intervals, wherein it is determined in view of the limited event streams how many points have to be spent for one or more events of the limiting event streams. Said amount of points to be spent may vary for the differently limited event streams assigned to a limiting event stream. Thus, it is, e.g., possible to rank the differently limited event streams differently or model a variable complexity per event.

In an advantageous embodiment, said mechanism is applied to a specific dependency type. Here a first group of tasks is assigned to a first resource and a second group of tasks to a second resource, wherein at least two tasks of the first group activate a first task of the second group directly or via several tasks, respectively. The following steps are required:

determining at least a limiting event stream for the outputted event streams of the first task, determining at least a limiting event stream for the incoming event streams of the second task if activation for at least a second task is not directly performed by a first task, detecting the costs jointly required of the second tasks considering the limiting event streams of the incoming event streams of the second task.

Limiting event streams can be automatically detected by the analysis method considering dependencies or may also be set by the user of the real-time analysis.

It is another kind of dependencies which can be described by limiting event streams if tasks can be activated only alternatively. This may occur, e.g., depending on certain data or processing results which require a decision between alternatives regarding the processing of data or the control of various actuators.

Another example of such alternatives is an engine control unit, wherein in various ranges of speed respective other tasks are activated, e.g., in order to calculate the optimally next ignition point.

Using a limiting event stream for these alternative tasks may ensure that in every step of the real-time analysis only one alternative, i.e., the most complex one in each case, will be considered.

SUMMARY OF THE DRAWINGS

A detailed description is given in the following:

FIG. 3 shows the calculation of the intervals of limiting event streams for competing tasks;

FIG. 4 shows the calculation of the contribution of higher priority tasks for the worst-case response time with limiting event streams.

DETAILED DESCRIPTION

Requirements of embedded systems increase from generation to generation. A car, for example, gets more software functionality in each generation which results in more complex embedded systems. New cars have up to 70 ECUs connected by several busses. Most functions have real-time constraints such as the engine management system and the ABS-system.

For a wide acceptance of real-time analysis by industrial software developers tight bounds to the real worst-case response times of tasks are important. A successful approach is the consideration of dependencies of chained task-sets. The invention provides a new holistic model to integrate different types of dependencies in real-time analysis. This general model according to the invention can be integrated into the schedulabilitiy analysis of fixed-priority systems.

Figure 1:
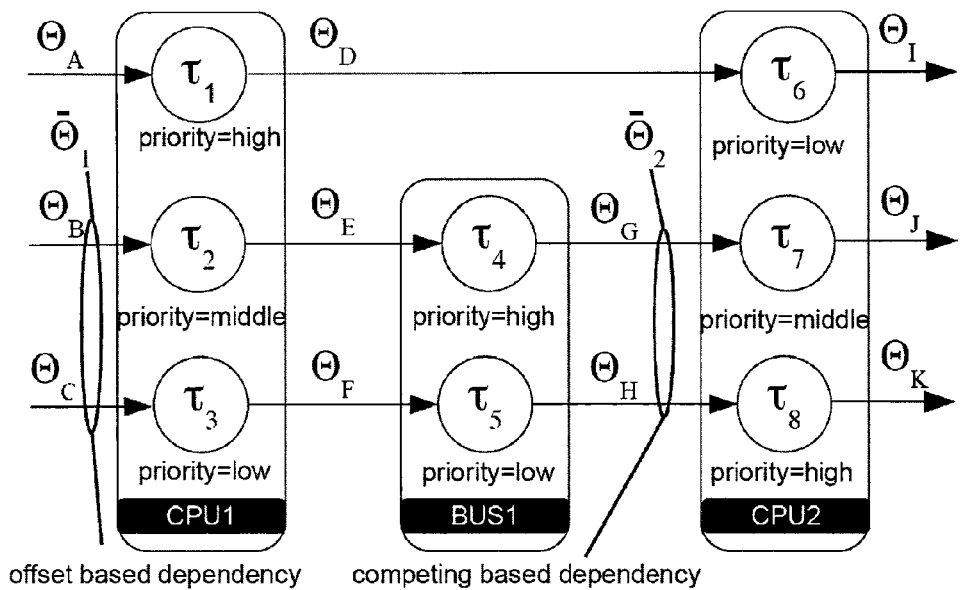
FIG. 1 shows an example of a distributed system having several different dependencies.

In FIG. 1 a typical distributed system is depicted. The system consists of two CPUs and one BUS. For this example, fixed priority scheduling on each resource is assumed. The system has eight tasks executed on the processors and the bus. The priorities are assigned as described in the figure. The stimulation of the tasks is represented by event streams $\Theta$.

In order to analyse the system from FIG. 1 it is necessary to calculate the worst-case response time for each task. The common way to do this is to assume that all tasks and event streams describing the stimulation in a system are independent. This means that events can occur during a worst-case response time analysis in their maximal density, because the context of the system is not considered. The result of a real-time analysis is that the interference between tasks is always maximal and leads to very pessimistic results.

To get tighter response time bounds, the invention introduces two kinds of dependencies: The first dependency is the competing based dependency describing the situation that tasks executed by the same component compete for this component. Such a competition has the effect that certain events can not occur in the same density when the tasks are assumed not to be independent as it is the case. For example, $\Theta_G$ and $\Theta_H$ in FIG. 1.

The second one is an offset based dependency describing that events from different event streams must occur time-shifted to each other. If, for example, the event streams $\Theta_B$ and $\Theta_C$ in FIG. 1 are considered, it is assumed that a correlation between the event streams exists. This has a direct impact on the successive tasks and event streams. The purpose of introducing this dependency is to show the generality of the approach according to the invention.

These two introduced dependencies lead to tighter bounds for the real-time analysis. It is desirable to include both dependencies into it. In previous work no holistic model as general approach to describe dependencies between tasks is existing.

In the following, the model necessary for the real-time analysis discussed below is described.

Task Model: $\Gamma$ is the a of tasks on one resource $\Gamma = \{\tau_1, \ldots, \tau_n\}$. A task is a 4-tuple with $\tau = (c+, c-, \phi, \Theta)$. $c+$ is the worst-case execution time, $c^-$ is the best-case execution time, $\phi$ is the priority for the scheduling (the lower the number the higher the priority) and $\Theta$ defines the stimulation of the task by an event stream. Let $\tau_{ij}$ be the j-th job/execution of task $\tau_i$.

It is assumed that each job of a task generates an event at the end of its execution to notify other tasks.

Event Stream Model: The event stream model gives an efficient general notation for the event bound function.

For the present invention, it is defined that the event bound function $\eta(\Delta t, \Theta)$ gives for every interval $\Delta t$ an upper bound on the number of events occurring from the event stream $\Theta$ in any interval of the length $\Delta t$. Thus, the event bound function is a subadditive function, that means for each interval $\Delta t$, $\Delta t'$ the following condition (1) applies:

$$\eta(\Delta t+\Delta t', \Theta) \leq \eta(\Delta t, \Theta) + \eta(\Delta t', \Theta) \tag{1}$$

$\eta(\Delta t, \Theta)$, $\eta(\Delta t', \Theta)$ return the maximum number of events possible within any $\Delta t$ or $\Delta t'$. The events in $\Delta t+\Delta t'$ have to occur either in $\Delta t$ or in $\Delta t'$. Therefore the condition holds.

For the present invention, it is also defined that an event stream $\Theta$ is a set of event elements $\theta$. Each event element is given by a period p and an offset a ($\theta=(p,a)$).

In cases where the worst-case density of events is unknown for a concrete system an upper bound of the densities can be used to describe the event stream. It is possible to model any event sequence. Only those event sequences for which the condition of subadditivity holds are valid event streams.

The event bound function for an event sequence $\Theta$ and an interval $\Delta t$ is given by:

$$\eta(\Delta t, \Theta) = \sum_{\substack{\theta \in \Theta \\ \Delta t \geq a_\theta}} \left\lceil \frac{\Delta t - a_\theta}{p_\theta} \right\rceil \tag{2}$$

As the inverse function, the following interval function is defined which gives to a number of events and an event stream the minimum interval in which these events can occur.

The interval function for a number of events and a $\Theta$ is given by:

$$\Delta t^+(n, \Theta) = \min\{\Delta t | \eta(\Delta t, \Theta) = n\} \tag{3}$$

Some examples of event streams can be found in Karsten Albers, Frank Bodmann, and Frank Slomka: Hierarchical event streams and event dependency graphs: A new computational model for embedded real-time systems. In *ECRTS '06: Proceedings of the 18th Euromicro Conference on Real-Time Systems*, pages 97-106, Washington, D.C., USA, 2006. IEEE Computer Society (incorporated herein by reference).

To extend the previous discussed model of embedded real-time systems the limiting event streams are described in the following.

For the present invention, it is defined that the limiting event stream is an event stream which defines the maximum occurrence of events for a set of event streams. The limiting event stream is defined as $\overline{\Theta}=(\Theta, \vec{\Theta})$. $\Theta$ describes the limiting event stream and $\vec{\Theta}$ represents the set of event streams for which the limiting event stream holds. The limiting event stream fulfils the condition:

$$\eta(\Delta t, \Theta) \leq \sum_{\Theta_i \in \vec{\Theta}} \eta(\Delta t, \Theta_i)$$

EXAMPLE 1

If no correlations between event streams are defined then $\overline{\Theta}=(\cup_{\Theta_i \in \vec{\Theta}} \Theta_i, \vec{\Theta})$.

EXAMPLE 2

FIG. 1 gives an example for a limiting event stream. Assume $\Theta_B=\Theta_C=\{(20,0)\}$ and an offset of 10 t.u. between these two event streams. The cumulated occurrence of events can be described by the limiting event stream: $\overline{\Theta}=(\{(20,0), (20,10)\}, \{\Theta_B, \Theta_C\})$. If the event streams are considered as independent we get two events in an interval $\Delta t=5$. But the limiting event stream describes how many cumulated events can occur in an interval $\Delta t$. With this dependency we get only one event in the interval $\Delta t=5$.

Next it is described how a limiting event stream can be calculated.

For the invention it is defined that $\Delta \beta : \Delta t \leftarrow n$ is a limiting interval function which assigns a minimal time interval from a given number of events in dependency from a given relationship of event streams $\vec{\Theta} := \{\Theta_1, \ldots, \Theta_n\}$, then a limiting event stream $\overline{\Theta}$ can be determined by:

$$\overline{\Theta} := v(\vec{\Theta}, \Delta \beta(n))$$

Note that $v(\vec{\Theta}, \Delta \beta(n))$ and $\Delta \beta(n)$ are abstract formulations which must be concretely formulated for the different types of dependencies.

In the following, the competing based dependency according to the invention is described. In FIG. 1 this kind of dependency between tasks is exemplarily depicted. The tasks $\tau_4$ and $\tau_5$ are executed by the same resource. Which means that they compete for the resource. In related work during the analysis of the tasks $\tau_4$ or $\tau_5$ the outgoing event streams $\Theta_G$ and $\Theta_H$ are considered independently.

Figure 2:
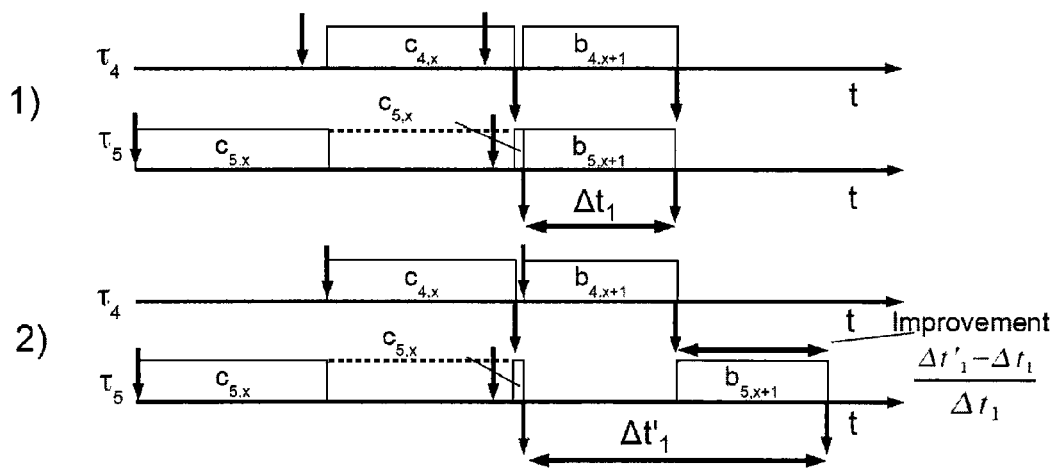
FIG. 2 shows an example of a limiting event stream describing a competing dependency.

FIG. 2 shows an example of a limiting event stream describing a competing dependency. Arrows above the time line represent incoming events. Arrows under the time line represent events generated by the task. In part one of the gantt-chart the case is considered of non competing tasks. The first jobs of the tasks are scheduled in the way that the two outgoing events can occur almost simultaneously. The next events are produced as soon as possible after the first event of the first job. In the independent case the next two events can occur also simultaneously. But this is not possible, since the jobs must be executed task after task, because $\tau_4$ and $\tau_5$ are executed by the same processor. This is depicted in the lower gantt-chart which describes the correct occurrence of the events. Because of the task interference it is not sufficient to consider the outgoing event streams independently from each other. This interference can be modelled by a limiting event stream.

As FIG. 2 illustrates two cumulated outgoing events can be generated simultaneously. This is based on the fact that the task with the higher priority interrupts the second task just before it finishes. The result is that the two events occur almost simultaneously. This can also be applied on n tasks with the result that n events can occur simultaneously.

For one task it can be concluded that at least $(n-1) \cdot c^-$ execution demands must be executed in order to generate n events.

To calculate the limiting event stream, the minimal distance between n events is determined by formulating the limiting interval function for competing based dependencies.

$\Gamma_R$ is considered to be a subset of m tasks sharing the same processor and $N=\{(n_i, \ldots, n_m)$:

$$\sum_{i=1}^{m} = n\}$$

the set of distributions of n events, where each task $\tau_i \in \Gamma_R$ produces $n_i$ events, then the limiting interval function is given by:

$$\Delta\beta(n) = \min_{(n_1\ldots n_m)\in N}\left(\max\left(\max_{i=1,\ldots m}(\Delta t + (n_i, \Theta_{\tau_i})), \left(\sum_{i=1}^{m}(n_i-1)\cdot c_{\tau_i}^-\right)\right)\right) \quad (4)$$

This can be proven in that it is assumed that n events can occur in a smaller distance than in the assumption. This would mean that one of the combinations of the minimum results in a shorter distance. Consequently, the interval function $\Delta t^+(n_i, \Theta_{\tau_i})$ or the sum $$\sum_{i=1}^{m}(n_i-1)\cdot c_{\tau_i}^-$$

delivers a shorter distance. Assume that the interval function $\Delta t^+(n_i, \Theta_{\tau_i})$ delivers a shorter distance and therefore the events occur in a shorter distance than in the event stream definition. But this is a contradiction according to the event stream definition. Therefore the sum over the best-case execution times must occur in a shorter distance. This can only occur when one of the considered execution times is smaller than the one from the assumption which is a contradiction since we already assume the best-case execution times for all tasks.

The invention introduces a procedure which delivers for n events the minimum interval in which they occur. This procedure is shown in FIG. 3. In the present invention, a normalisation for event streams is introduced in order to calculate $\Delta t^+(n,\Theta)$ efficiently.

In FIG. 3, the outer loop iterates over all combinations considered by the above minimal operation (lines 4 to 10). Line 5 considers all intervals of each event stream as it is done by $\max(\Delta t^+(n_i,\Theta_{\tau_i}))$. The inner loop (lines 7 to 9) calculates the minimal distance produced by the best-case execution times like $$\sum_{i=1}^{m}(n_i-1)\cdot c_{\tau_i}^-.$$

Finally, the minimum of all intervals is determined and the minimal interval in which n cumulated events can occur is returned (line 10).

In order to show the generality of the approach according to the invention, the problem about offsets introduced in the transaction model by Rodolfo Pellizzoni and Giuseppe Lipari (Improved schedulability analysis of real-time transactions with earliest deadline scheduling. In *RTAS '05: Proceedings of the 11th IEEE Real Time on Embedded Technology and Applications Symposium*, pages 66-75, Washington, D.C., USA, 2005. IEEE Computer Society; (incorporated herein by reference)) is adapted. Only static offsets between task stimulation as an example is considered, however this approach covers also dynamic offsets.

For the invention it is assumed that for two strict periodic tasks $\tau_1$ and $\tau_2$ with an offset a we only have to calculate the minimum distance a' between events of $\tau_1$ and $\tau_2$. This minimum distance is calculated by $a'=\min(\mathrm{mod}(a,x), \mathrm{mod}(-a,x))$ using the greatest common divisor $x=\gcd(p\tau_1, p\tau_2)$ of the periods of the tasks. Leading to the limiting interval function:

$$\Delta\beta(n)=\min(\Delta t^+(n,\{(p\tau_1,0),(p\tau_2,a')\}), \Delta t^+(n,\{(p\tau_1,a'),(p\tau_2,0)\})) \quad (5)$$

Now we can directly set up the event stream via $v(\vec{\Theta},\Delta\beta(n))$: In the case of $\mathrm{mod}(a,x)\leq\mathrm{mod}(-a,x)$ the limiting event stream is $\overline{\Theta}(\{(p\tau_1,0), (p\tau_2,\alpha')\},\{\Theta_{\tau_1}, \Theta_{\tau_2}\})$. In the case of $\mathrm{mod}(-a,x)<\mathrm{mod}(a,x)$ the limiting event stream is $\overline{\Theta}=(\{(p\tau_1,\alpha'),(p\tau_2,0)\},\{\Theta_{\tau_1},\Theta_{\tau_2}\})$. For more than two tasks the approach can be adapted to calculate the limiting interval functions.

In order to use the limiting event streams it is necessary to adapt the new concept to the real-time analysis, especially the worst-case response time analysis. We have to determine how great the worst-case contribution of tasks in an interval $\Delta t$ is when limiting event streams are considered.

It is now assumed that the maximal contribution of tasks in an interval $\Delta t$ occurs when the task with the maximum worst-case execution occurs as much as possible, then the task with the second greatest execution time as much as possible up to the task with the smallest worst-case execution time until the limiting event streams prohibits the occurrence of further events.

This can be proven by assuming that there is another distribution than the one given by the assumption. Therefore, it must exist at least one event which does not follow the pattern in the assumption. In order to increase the contribution of the tasks, the event must trigger a task whose worst-case execution time is greater than assumed. But this is a contradiction, since we already assume for all tasks with greater worst-case execution times the maximum number of invocations.

The response time analysis is defined as follows: if the condition $\forall\tau\in\Gamma:r^+(\tau)\leq d_\tau$ holds, the task set is feasible and the real-time analysis is successful. The worst-case response time of a task considering event streams can be calculated by:

$$r^+(\tau) = \max_{k\in\mathbb{N}}\{r^+(k,\tau) - \Delta t^+(k,\Theta_\tau) \mid r^+(k-1,\tau) > \Delta t^+(k,\Theta_\tau)\} \quad (6)$$

$$r^+(k,\tau) = \begin{cases} c_\tau^+ & k=0 \\ \min\left\{\Delta t \mid \Delta t = k\cdot c_\tau^+ + \underbrace{\sum_{\tau'\in HP}\eta(\Delta t,\Theta_{\tau'})\cdot c_{\tau'}^+}_{calcHPStatic}\right\} & k\geq 1 \end{cases}$$

The amount of executions produced by higher priority tasks can be calculated by the event bound function multiplied by the worst-case execution time. By means of a fixed-point iteration the worst-case response time can be calculated for every job k.

To implement $\Sigma_{\tau'\in HP}\eta(\Delta t,\Theta_{\tau'})\cdot c_{\tau'}^+$ the algorithm in FIG. 4 was developed. The rest of equation 6 is unmodified.

The algorithm has as parameters the interval $\Delta t$ which is considered, k the job number of the task under analysis, i the task which is explored, $\overline{\Theta}_{all}$ the set of the necessary limiting event streams and $F_{HP}$ containing all tasks having a higher priority than $\tau$. The algorithm sorts the tasks by their worst-case execution times (line 8) and stores for every limiting event stream the maximum amount of events which this stream allows within $\Delta t$ (line 9). The number of invocations of the task under analysis i must be subtracted from the corresponding limiting event streams (line 10). In a loop (line 11 to 16) all higher priority tasks are considered. The task with the greatest worst-case execution time is considered first. The algorithm determines the maximum amount of invocations for the task by the event stream of the task (line 12) and the bound of the event stream if one exists (line 13). The minimum of these are used to calculate the maximum contribution of the task within Δt (line 14). The second loop (line 15 to 16) reduces the corresponding limiting event streams by the used events (line 16). Therefore the loops distribute the amount of events of the limiting event streams over the tasks. This leads to the worst-case contribution of higher priority tasks within Δt.

Note, that the complexity of the response time analysis is still pseudo-polynominial. The complexity to calculate the limiting event streams depends on the kind of the dependency which is considered. To calculate the problem of competing-based dependencies can become challenging, because of its combinatorial complexity. The analysis, however, is not affected by this problem. So it is suggestive to find upper bounds for the limiting event streams to improve the runtime performance.

The significance of this new approach is shown by the following case study. The system to explore is depicted in FIG. 1 and described above. Table 1 gives the parameters for the system and table 2 the event streams. We have chosen this system, because it is easy to follow and it shows the new methodology in the whole.

TABLE 1

Parameters of the distributed system which is depicted in FIG. 1

| CPU 1 | $\tau_1$ | $\tau_2$ | $\tau_3$ | BUS 1 | $\tau_4$ | $\tau_5$ |
|---|---|---|---|---|---|---|
| $c^+$ | 40 | 30 | 40 | $c^+$ | 90 | 90 |
| $c^-$ | 30 | 20 | 20 | $c^-$ | 50 | 80 |
| $\phi$ | 1 | 2 | 3 | $\phi$ | 1 | 2 |
| $\Theta$ | $\Theta_A$ | $\Theta_B$ | $\Theta_C$ | $\Theta$ | $\Theta_E$ | $\Theta_F$ |

| CPU 2 | $\tau_6$ | $\tau_7$ | $\tau_8$ |
|---|---|---|---|
| $c^+$ | 50 | 35 | 35 |
| $c^-$ | 30 | 25 | 25 |
| $\phi$ | 3 | 2 | 1 |
| $\Theta$ | $\Theta_D$ | $\Theta_G$ | $\Theta_H$ |

To calculate the event streams of the system, the invention may use the approach given in Steffen Kollmann, Karsten Albers, and Frank Slomka. Effects of simultaneous stimulation on the event stream densities of fixed-priority systems. In *Spects '08: Proceedings of the International Simulation Multi-Conference*. IEEE, June 2008 (incorporated herein by reference). The resulting event streams in the system are shown in the Table 2. Thereby, we compare the event streams calculated with dependencies versus ones without dependencies. A static offset of 100 t.u. between the event streams $\Theta_B$ and $\Theta_C$ is assumed.

TABLE 2

All event streams of the distributed system. The results are computed with as well as without the approach.

| $\Theta$ | with dependencies | without dependencies |
|---|---|---|
| $\Theta_A$ | {(100, 0)} | {(100, 0)} |
| $\Theta_B$ | {(200, 0)} | {(200, 0)} |
| $\Theta_C$ | {(200, 0)} | {(200, 0)} |
| $\Theta_D$ | {(∞, 0), (100, 90)} | (∞, 0), (100, 90)} |
| $\Theta_E$ | {(∞, 0), (200, 150)} | {(∞, 0), (200, 150)} |
| $\Theta_F$ | {(∞, 0), (200, 140)} | {(∞, 0), (200, 70)} |
| $\Theta_G$ | {(∞, 0), (200, 100)} | {(∞, 0), (200, 100)} |
| $\Theta_H$ | {(∞, 0), (∞, 80), (∞, 160), (200, 310)} | {(∞, 0), (∞, 80), (∞, 160), (∞, 240), (200, 370)} |
| $\Theta_I$ | {(∞, 0), (∞, 30), (∞, 60), (100, 130)} | {(∞, 0), (∞, 30), (∞, 60), (∞, 90), (100, 165)} |
| $\Theta_J$ | {(∞, 0), (200, 55)} | {(∞, 0), (200, 55)} |
| $\Theta_K$ | {(∞, 0), (∞, 70), (∞, 150), (200, 300)} | {(∞, 0), (∞, 70), (∞, 150), (∞, 130), (200, 360)} |

To determine the outgoing event streams with dependencies it is necessary to calculate the limiting event streams of the system. We consider only two limiting event streams $\overline{\Theta}_1$ and $\overline{\Theta}_2$. $\overline{\Theta}_1$ describes the offset between $\Theta_B$ and $\Theta_C$. $\overline{\Theta}_2$ describes the competing based dependency between $\Theta_G$ and $\Theta_H$.

TABLE 3

Results of the calculated limiting event streams

| $\overline{\Theta}$ | $\Theta$ | $\theta$ |
|---|---|---|
| $\overline{\Theta}_1$ | {(200, 0), (200, 100)} | {$\Theta_B, \Theta_C$} |
| $\overline{\Theta}_2$ | {(∞, 0) , (∞, 0), (∞, 80), (∞, 130), (∞, 210), (200, 300), (200, 310)} | {$\Theta_G, \Theta_H$} |

Figure 5:
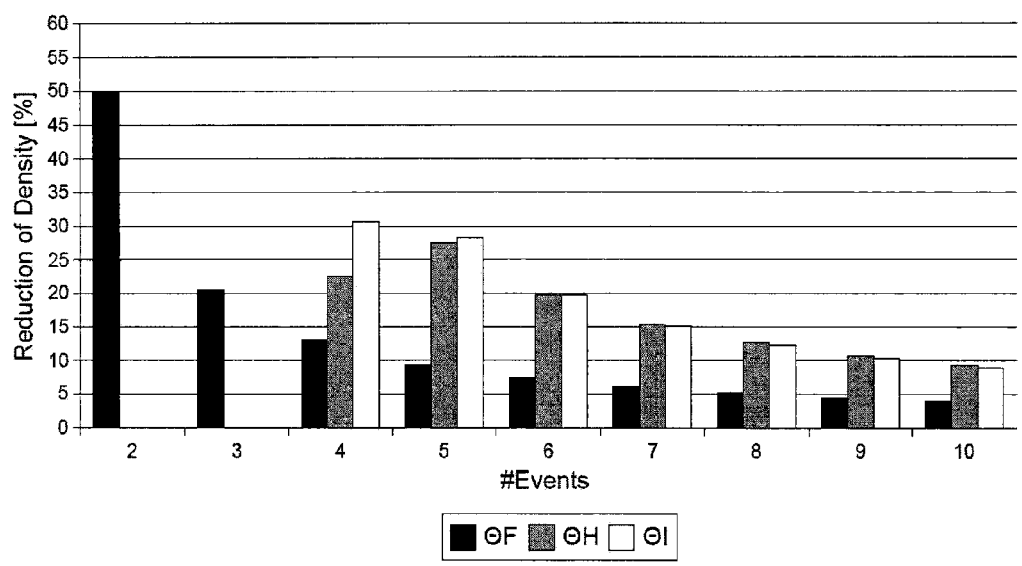
FIG. 5 shows the improvements of the intervals in percent of the event stream $\Theta_F$, $\Theta_H$ and $\Theta_J$.

After calculating the event streams, we have a closer look on the improvements in the analysis of the system. At first, some event streams and the improvement of the density in the system are considered. This is depicted in Table 4 and FIG. 5.

TABLE 4

This shows the improvement of the approach on the event streams $\Theta_F$, $\Theta_H$ and $\Theta_J$. $\Theta$ shows the intervals with the dependency, $\Theta'$ shows the intervals without the dependency, improvement is given in %

| n | $\Theta_F$ | $\Theta_F^1$ | imp. | $\Theta_H$ | $\Theta_H^1$ | Imp. | $\Theta_I$ | $\Theta_I^1$ | imp. |
|---|---|---|---|---|---|---|---|---|---|
| 1 | 0 | 0 | 0% | 0 | 0 | 0% | 0 | 0 | 0% |
| 2 | 140 | 70 | 50% | 80 | 80 | 0% | 30 | 30 | 0% |
| 3 | 340 | 270 | 20.58% | 160 | 160 | 0% | 60 | 60 | 0% |
| 4 | 540 | 470 | 12.96% | 310 | 240 | 22.5% | 130 | 90 | 30.7% |
| 5 | 740 | 670 | 9.45% | 510 | 370 | 27.45% | 230 | 165 | 28.26% |
| 6 | 940 | 870 | 7.44% | 710 | 570 | 19.71% | 330 | 265 | 19.69% |
| 7 | 1140 | 1070 | 6.14% | 910 | 770 | 15.38% | 430 | 365 | 15.11% |
| 8 | 1340 | 1270 | 5.22% | 1110 | 970 | 12.61% | 530 | 465 | 12.26% |
| 9 | 1540 | 1470 | 4.54% | 1310 | 1170 | 10.68% | 630 | 565 | 10.31% |
| 10 | 1740 | 1670 | 4.02% | 1510 | 1370 | 9.27% | 730 | 665 | 8.9% |

The dependencies have not only an influence on the density of the event streams, but also a direct influence on the worst-case response times. The worst-case response time of the task $\tau_3$ has been reduced from 150 t.u. to 80 t.u. This means that the result of the analysis with dependencies is in this case 46.66% tighter compared to the analysis without dependencies. The task $\tau_6$ has a worst-case response time without dependencies of 255 t.u. and with dependencies of 205 t.u., which is a reduction of the worst-case response time of 19.6%.

This example shows that dependencies can improve the real-time analysis. Thereby we have shown how easy different dependencies can be combined in a general approach.

The invention provides the possibility to achieve a holistic model for task dependencies in distributed real-time systems. The new approach has been applied to fixed-priority systems. Two kinds of dependencies are described and it is how these can be described by the new defined limiting event streams. Thereby, a new kind of dependency has been introduced. With the effect, that the invention cuts the complexity of the dependencies from the real-time analysis.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

Furthermore, in the claims the word "comprising" does not exclude other elements or steps, and the indefinite article "a" or "an" does not exclude a plurality. A single unit may fulfil the functions of several features recited in the claims. The terms "essentially", "about", "approximately" and the like in connection with an attribute or a value particularly also define exactly the attribute or exactly the value, respectively. Any reference signs in the claims should not be construed as limiting the scope.

The invention claimed is:

1. A computer-implemented method for analyzing the real-time capability of a computer system that executes repeatedly task provided in the computer system, wherein execution of a task is triggered by an activation of the task that represents an event associated with the task, the method comprising:
   providing a plurality of descriptive elements that describe a time correlation of events as event streams;
   detecting using the event streams at least one of maximum time densities of the events and minimum time densities of the events; and
   providing at least a further descriptive element of a limiting event stream to which an amount of limited event streams is assigned, wherein the further descriptive element is
   (i) a first descriptive element that further describes a maximum time correlation of an entirety of events captured by at least two of the assigned limited event streams, wherein for at least a time interval dt, an amount of events admissible by the limiting event stream in dt, is lower than a sum of events admissible by the assigned limited event streams in dt, or
   (ii) a second descriptive element that further describes a minimum time correlation of an entirety of events captured by at least two of the assigned limited event streams, wherein for at least a time interval dt, an amount of events admissible by the limiting event stream in dt, exceeds a sum of events admissible by the assigned limited event streams in dt.

2. The method according to claim 1, wherein the computer system includes at least one component or resource wherein the method further comprises assigning at least two tasks to the at least one component or resource.

3. The method according to claim 1, wherein at least two tasks are included in a group, the tasks of the group are assigned to a resource wherein the tasks compete for the resource or the tasks dispose of the resource at different times, wherein the method further comprises determining a point in time where a certain task of the group is assigned to the resource.

4. The method according to claim 1, wherein the limiting event stream is assigned at least two limited event streams, that activate respectively different tasks, the respective tasks are assigned to at least one joint group, wherein costs are respectively assigned to the respective tasks that capture temporal use of a resource by a task for respectively one event, wherein the method comprises:
   assigning events of the limiting event stream to a first task with a highest cost, wherein an amount of the events that are assigned is limited by an event stream activating the first task;
   determining remaining events of the limiting event stream on the basis of the amount of the events that are assigned;
   assigning the remaining events of the limiting event stream to a second task with a next highest cost, the amount of the events that are assigned being in turn limited by an event stream activating, the second task;
   repeating determining and assigning until all remaining events of the limiting event stream are assigned, and
   determining a joint cost from the costs assigned to the respective tasks and an amount of the events that are assigned.

5. The method according to claim 1, wherein the limiting event stream is assigned at least two limited event streams that activate respectively different tasks, the respective tasks are assigned to at least a joint group, wherein the respective tasks are assigned respective costs detecting temporal use of a resource by a task for respectively one event, wherein the method further comprises:
   assigning events of the limiting event stream to a first task with a lowest cost, wherein an amount of the events that are assigned is limited by an event stream activating the first task;
   determining remaining events of the limiting event stream on the basis of the amount of the events that are assigned;
   assigning the remaining events of the limiting event stream to second task with a next lowest cost, the amount of the events that are assigned being in turn limited by an event stream activating the second task;
   repeating determining and assigning until all remaining events of the limiting event stream are assigned; and
   determining a joint cost from the costs assigned to the respective tasks and an amount of the events that are assigned.

6. The method according to claim 1, wherein at least two event streams are assigned two different limiting event streams, the at least two event streams activating respectively different tasks, the respective tasks are assigned to at least a joint group, wherein the respective tasks are assigned respective costs detecting temporal use of a resource by a task for respectively one event, wherein the method further comprises:
   assigning events of the limiting event streams to a first task with a highest cost, wherein an amount of the events that are assigned is limited by an event stream activating the first task and a minimum amount of events respectively admissible by the limiting event streams;

determining the remaining events of the limiting event streams, on the basis of the amount of the events that are assigned;

assigning the remaining events of the limiting event streams to a second task with a next highest cost, the amount of the events that are assigned being in turn limited by an event stream activating the second task and other limiting event streams assigned to the task;

repeating determining and assigning until all remaining events of the limiting event streams are assigned or an amount of events that are assigned to all tasks of the at least one joint group; and determining a joint cost from the costs assigned to respective tasks and the amount of events that are assigned.

7. The method according to claim 1, wherein the limiting event stream is assigned an amount of points to describe a density of the events in the at least one time interval and the limiting event stream is assigned at least two limited event streams that require a different amount of points for an event.

8. The method according to claim 1, wherein activation of a first task is performed by a second task, and wherein time correlation of activations associated with the first task and the second task is also captured by an outputted event stream of the first task and an incoming event stream of the second task.

9. The method according to claim 1, wherein at least two resources are assigned to the computer system, wherein a first group of tasks is assigned to a first resource and a second group of tasks is assigned to a second resource, wherein at least two tasks of the first group respectively activate a task of the second group directly or via a plurality of tasks, wherein the method further comprises:

determining at least a limiting event stream for outputted event streams of a first task in the first group;

determining at least a limiting event stream for incoming event streams of a second task in the second group unless activation for the second task in the second group is performed directly by the first task of the first group; and determining a joint cost of second tasks in the second group on the basis of the limiting event of stream for the incoming event streams of second tasks.

10. The method according to claim 9, wherein the method further comprises determining at least one limiting event stream associated with the second tasks using the limiting event stream associated with the first task.

11. The method according to claim 1, wherein the tasks are units that are executable by a processor or an electronic circuit module.

* * * * *

UNITED STATES PATENT AND TRADEMARK OFFICE
CERTIFICATE OF CORRECTION

| | |
|---|---|
| PATENT NO. | : 8,533,727 B2 |
| APPLICATION NO. | : 13/201301 |
| DATED | : September 10, 2013 |
| INVENTOR(S) | : Albers et al. |

Page 1 of 1

It is certified that error appears in the above-identified patent and that said Letters Patent is hereby corrected as shown below:

In the Specification

Column 12, line 47:

Now reads:    "Δt first"

Should read:    -- At first --

Signed and Sealed this
Eleventh Day of March, 2014

Michelle K. Lee
*Deputy Director of the United States Patent and Trademark Office*